United States Patent
Malki

(10) Patent No.: US 12,194,965 B2
(45) Date of Patent: Jan. 14, 2025

(54) WRAP AROUND STATION AND AUTOMATED CAR WASH SYSTEM INCLUDING THE SAME

(71) Applicant: ABA Highpoint LLC, Yonkers, NY (US)

(72) Inventor: Shlomo Malki, Scarsdale, NY (US)

(73) Assignee: ABA Highpoint LLC, Yonkers, NY (US)

( * ) Notice: Subject to any disclaimer, the term of this patent is extended or adjusted under 35 U.S.C. 154(b) by 0 days.

(21) Appl. No.: 18/138,896

(22) Filed: Apr. 25, 2023

(65) Prior Publication Data

US 2024/0359664 A1    Oct. 31, 2024

(51) Int. Cl.
*B60S 3/06*    (2006.01)

(52) U.S. Cl.
CPC ............ *B60S 3/063* (2013.01); *B60S 3/066* (2013.01)

(58) Field of Classification Search
CPC ............ B60S 3/06; B60S 3/066; B60S 3/063
USPC ........................................................ 15/53.3
See application file for complete search history.

(56) References Cited

U.S. PATENT DOCUMENTS

| 4,021,877 A | * | 5/1977 | Miner | B60S 3/063 |
| | | | | 15/53.2 |
| 8,601,632 B2 | * | 12/2013 | Ennis | B60S 3/063 |
| | | | | 15/53.2 |

FOREIGN PATENT DOCUMENTS

| EP | 0287541 A2 | * | 4/1987 | |
| EP | 980802 A2 | * | 2/2000 | B60S 3/063 |

OTHER PUBLICATIONS

Translation of EP0980802A2 (Year: 2000).*

* cited by examiner

*Primary Examiner* — Tom Rodgers
(74) *Attorney, Agent, or Firm* — Amster, Rothstein & Ebenstein LLP

(57) ABSTRACT

A wrap around station of a car wash including a cross piece comprising one or more cross beams and a pair of roller assemblies disposed on the cross piece. Each roller assembly includes one or more first rollers with a substantially vertical axis of rotation, and one or more second rollers with a substantially horizontal axis of rotation. Each of the one or more first and second rollers are arranged to rotate in contact with at least one of the one or more cross beams. A pair of linear actuators are configured to move the roller assemblies along the cross piece. A first side brush and a second side brush are each pivotally and rotatably attached to a corresponding one of the roller assemblies so that the first and second side brushes are moveable along the cross piece and pivotable relative to the cross piece and relative to one another.

12 Claims, 6 Drawing Sheets

WRAP AROUND STATION AND AUTOMATED CAR WASH SYSTEM INCLUDING THE SAME

FIELD OF THE INVENTION

The present invention generally relates to automated car wash systems, and more particularly to specific components of such systems, such as, for example, components that include brushes and other cleaning mechanisms.

BACKGROUND

Automatic car washes include a number of components to convey a vehicle through the car wash tunnel, apply fluids such as cleaning agents and water to the vehicles, polish the vehicle and finally to dry and buff the vehicle. These components include, for example, conveyors, sensors, spray arches, spray nozzles, brushes, wrap arounds, mitters and dryers. Wrap arounds are particularly important components because they must operate effectively to clean the vehicle after application of cleaning agents, and thus must be able to hug the contours of the vehicle without causing damage.

SUMMARY OF THE INVENTION

An object of the present invention is to provide a wrap around station of an automatic car wash with brushes that are moveable in relation to the vehicle as the vehicle progresses through the wrap around cleaning station to avoid damage and to access the various surfaces of the vehicle.

Another object of the present invention is to provide a wrap around station with brushes that spin around a generally vertical center of rotation while allowing the center of rotation to pivot and which also actuates the brushes in a side-to-side motion so that the brushes more closely follow the contours of a vehicle as the vehicle progresses through the station, which in turn enhances the effectiveness of the brushes in cleaning the vehicle.

A wrap around station of a car wash according to an exemplary embodiment of the present invention comprises: a cross piece comprising one or more cross beams; a pair of roller assemblies disposed on the cross piece, each roller assembly comprising: one or more first rollers with a substantially vertical axis of rotation; and one or more second rollers with a substantially horizontal axis of rotation, each of the one or more first and second rollers being arranged to rotate in contact with at least one of the one or more cross beams; a pair of linear actuators, each linear actuator configured to move a corresponding one of the roller assemblies along the cross piece; and a first side brush and a second side brush, each rotatably and pivotally attached to a corresponding one of the roller assemblies so that the first and second side brushes are moveable along the cross piece and pivotable relative to the cross piece and relative to one another.

In an exemplary embodiment, the one or more second rollers comprise at least one pair of second rollers.

In an exemplary embodiment, the one or more cross beams comprise a plurality of cross beams.

In an exemplary embodiment, the at least one pair of second rollers are arranged to rotate in contact with one of the plurality of cross beams.

In an exemplary embodiment, each second roller in the at least one pair of second rollers is arranged to rotate in contact with a corresponding one of the plurality of cross beams.

In an exemplary embodiment, the one or more first rollers comprise at least one pair of first rollers.

In an exemplary embodiment, each first roller in the pair of first rollers is arranged to rotate in contact with one of the plurality of cross beams.

In an exemplary embodiment, the linear actuators comprise pneumatic piston assemblies.

In an exemplary embodiment, the cross piece comprises an inner support structure and an outer support structure.

In an exemplary embodiment, the pair of linear actuators are disposed on the outer support structure.

In an exemplary embodiment, the pair of roller assemblies are disposed on the inner support structure.

In an exemplary embodiment, the inner support structure is rotatably mounted to the outer support structure.

In an exemplary embodiment, the wrap around station further comprises lever arms that attach each linear actuator in the pair of linear actuators to a corresponding one of the roller assemblies in the pair of roller assemblies.

In an exemplary embodiment, the cross piece further comprises a center plate disposed between the roller assemblies.

In an exemplary embodiment, the linear actuators are configured to move the first and second side brushes in a sequence of movements.

In an exemplary embodiment, the sequence of movements comprises a first movement in which the first and side brushes are moved towards one another, a second movement in which the first and second brushes are moved away from one another, and a third movement in which the first and second brushes are again moved towards one another.

These and other features and advantages of the present invention will be presented in more detail in the following detailed description and the accompanying figures which illustrate by way of example principles of the invention.

DESCRIPTION OF THE DRAWINGS

Various exemplary embodiments of this invention will be described in detail, with reference to the following figures, wherein.

DETAILED DESCRIPTION

A technological problem exists regarding conventional wrap around stations in automatic car washes in that they are not able to effectively clean around the contours of a vehicle while at the same time ensuring that damage is not done to the vehicle. In various exemplary embodiments, the present invention provides a technological solution to this problem with the use of rotating brushes that are movable in lateral and pivoting directions relative to the wrap around station support structure and relative to one another so as to follow the contours of a vehicle while preventing damage.

Figure 1:
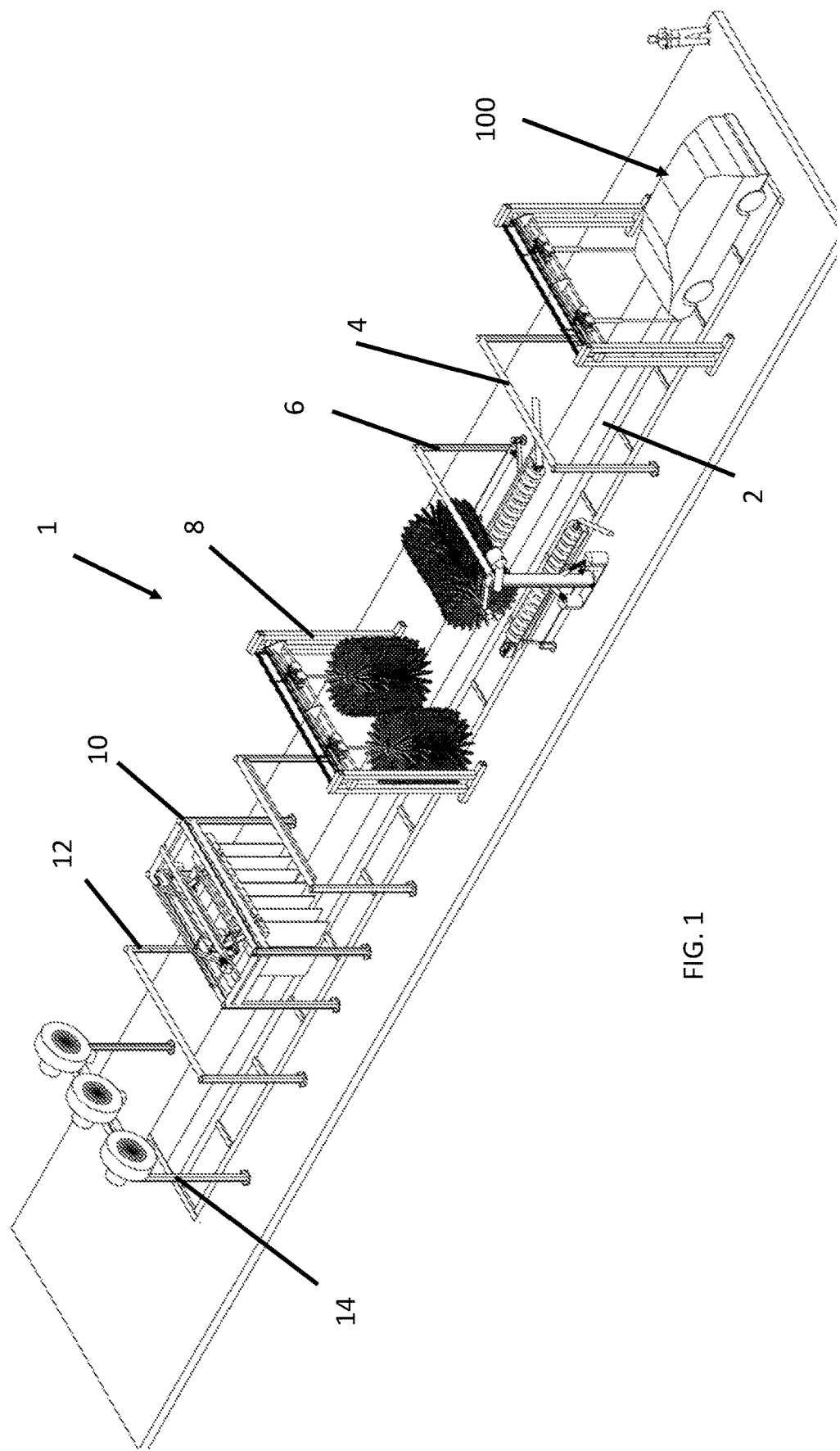
FIG. 1 is a representative diagram of an automatic car wash according to an exemplary embodiment of the present invention.

FIG. 1 is a representative diagram of an automatic car wash, generally designated by reference number 1, according to an exemplary embodiment of the present invention. The car wash 1 includes a conveyor 2, one or more first arches 4, rocker brush station 6, wrap around station 8, mitter station 10, at least one second arch 12 and a drying station 14. One or more sensors (now shown) may detect entry of a vehicle 100 into the car wash tunnel so that the components of the car wash operate in sequence at appropriately timed intervals based on the conveyor speed. The first arches 4 are generally tunnel-shaped and include nozzles that apply cleaning fluids to the vehicle, including, for example, pre-soak, soap and foamer, to name a few. The vehicle 100 then passes through the rocker brush station 6, where rocker brushes are used to clean smaller parts of the vehicle, such as, for example, the wheels, roof, rear view mirrors and lower side panels, to name a few. The vehicle then passes through the wrap around station 8 where larger rollers brush the various surfaces of the vehicle to clean the vehicle using the applied cleaning fluids. After cleaning at the wrap around station 8, the vehicle proceeds through the mitter station 10, which includes long strips of material that further wipe and remove dirt from the vehicle. The vehicle then proceeds to the second arch 12, which performs a final rinse of the vehicle and may apply additional agents to the vehicle, such as, for example, clear coat, sealer wax, and a drying agent, to name a few. The drying station 14 may include a plurality of blowers to dry the vehicle.

Figure 2:
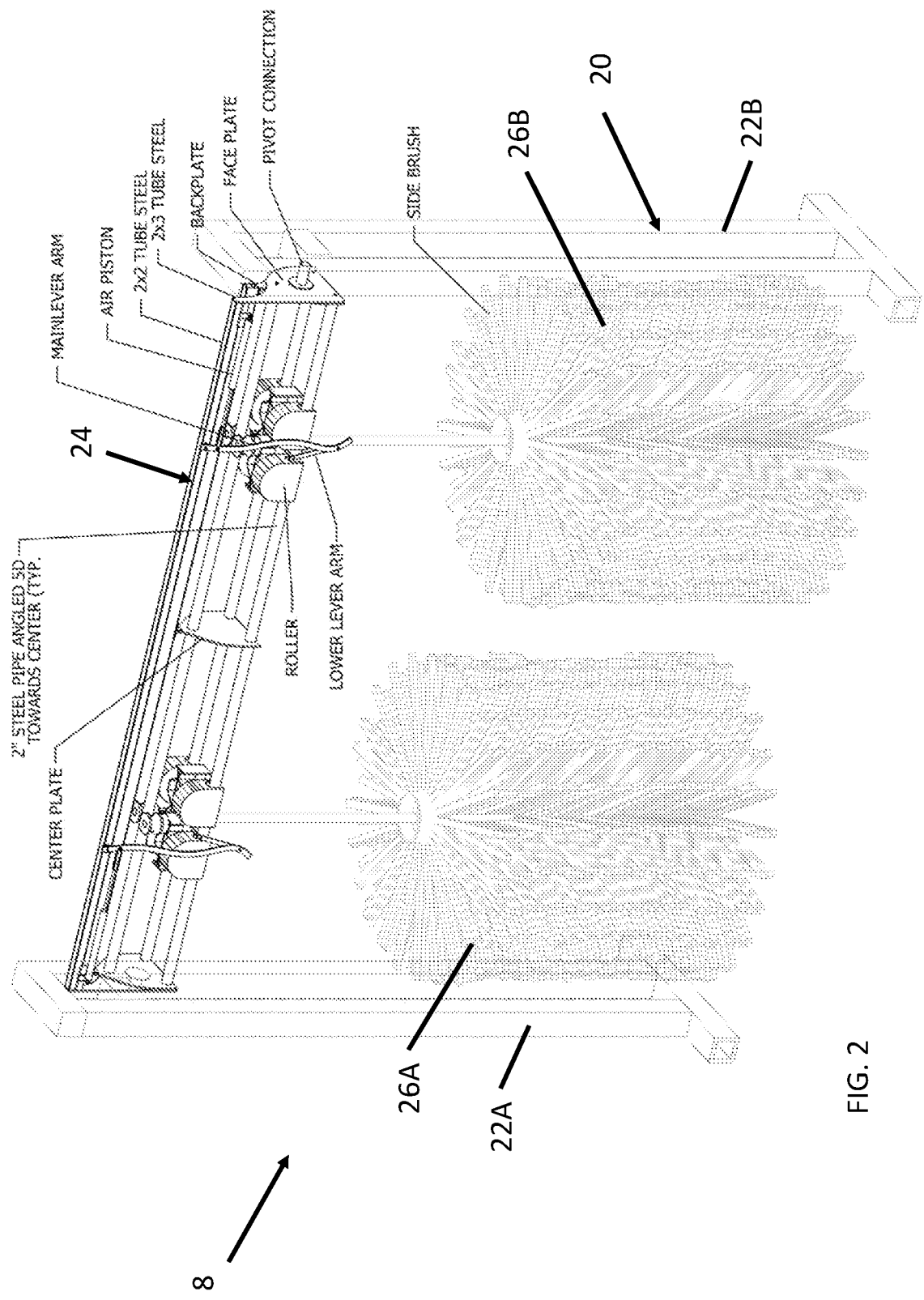
FIG. 2 is a perspective view of a wrap around station according to an exemplary embodiment of the present invention.

FIG. 2 is a perspective view of the wrap around station 8 according to an exemplary embodiment of the present invention. The wrap around station 8 includes a main support structure 20 made up of two legs 22A and 22B and a cross piece 24 extending between top portions of the legs 22A, 22B. As explained in detail below, the cross piece 24 in turn includes a number of components that support two side brushes 26A, 26B in a side-by-side arrangement and operate to move the brushes 26A, 26B away and toward one another to maintain the brushes 26A, 26B in contact with the vehicle 100 as the vehicle 100 passes through the wrap around station 8.

Figure 3:
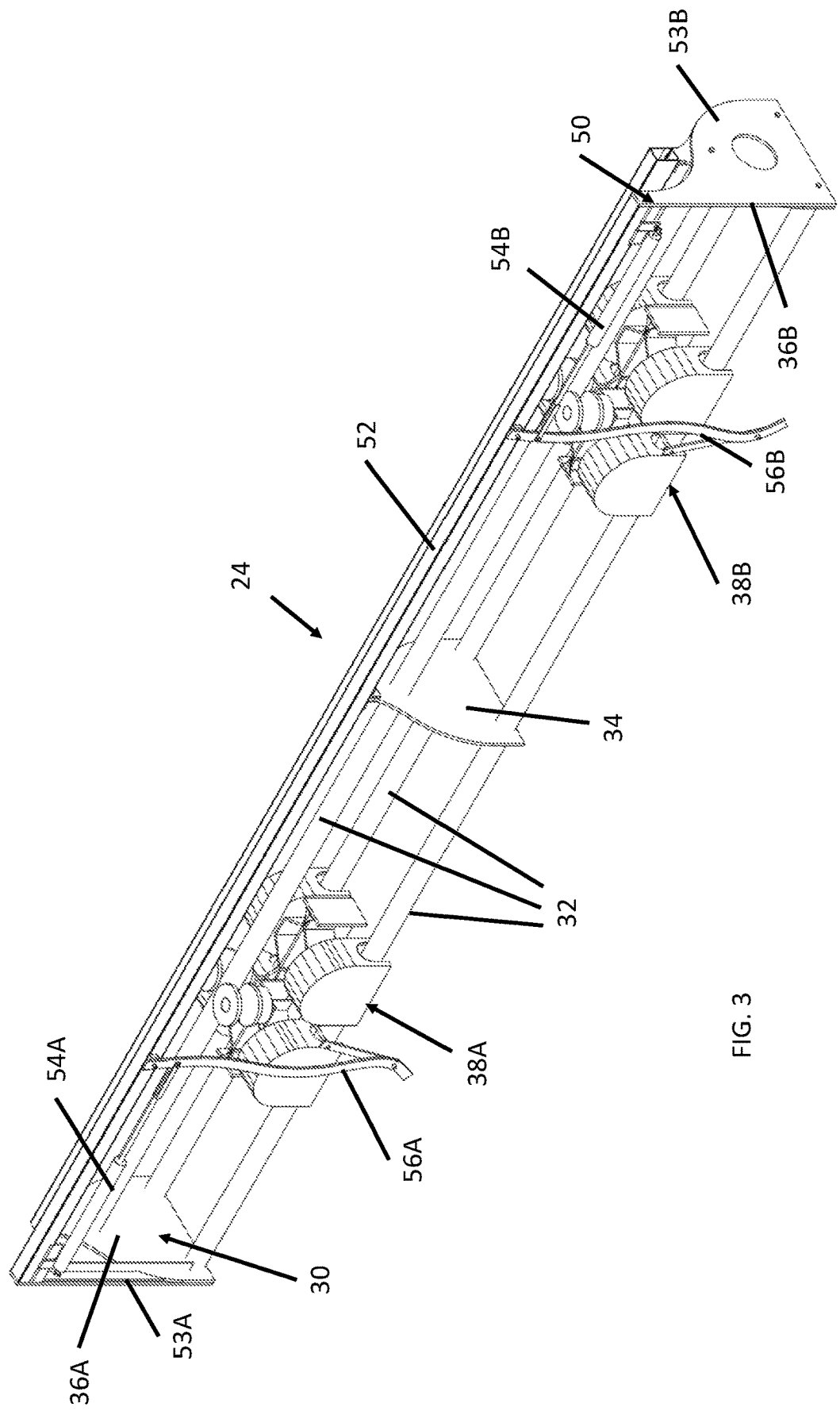
FIG. 3 is an exploded view of a roller assembly according to an exemplary embodiment of the present invention.
Figure 5:
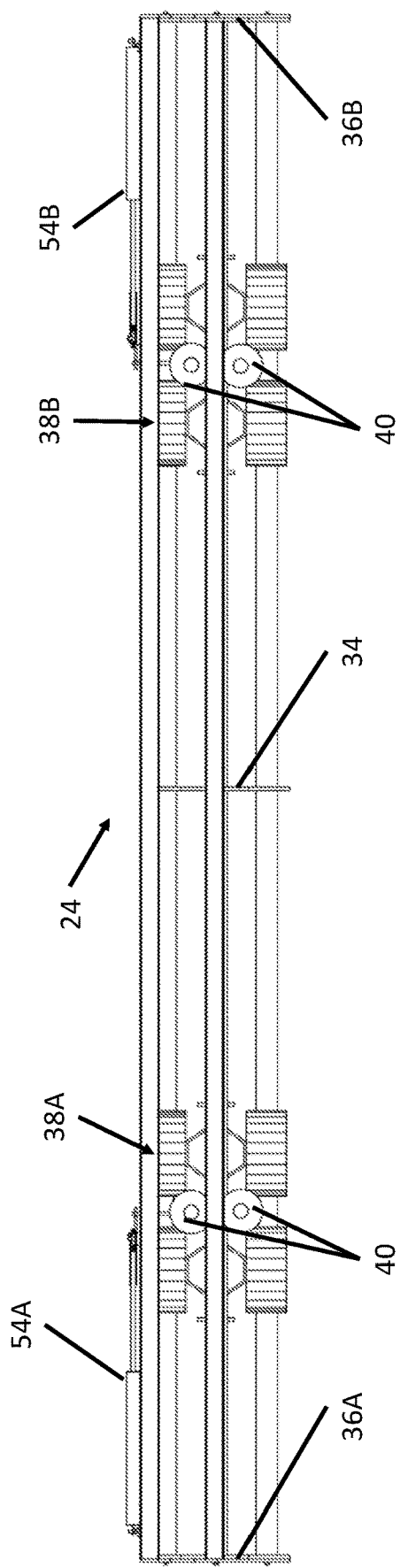
FIG. 5 is a top view of a cross piece according to an exemplary embodiment of the present invention.
Figure 6:
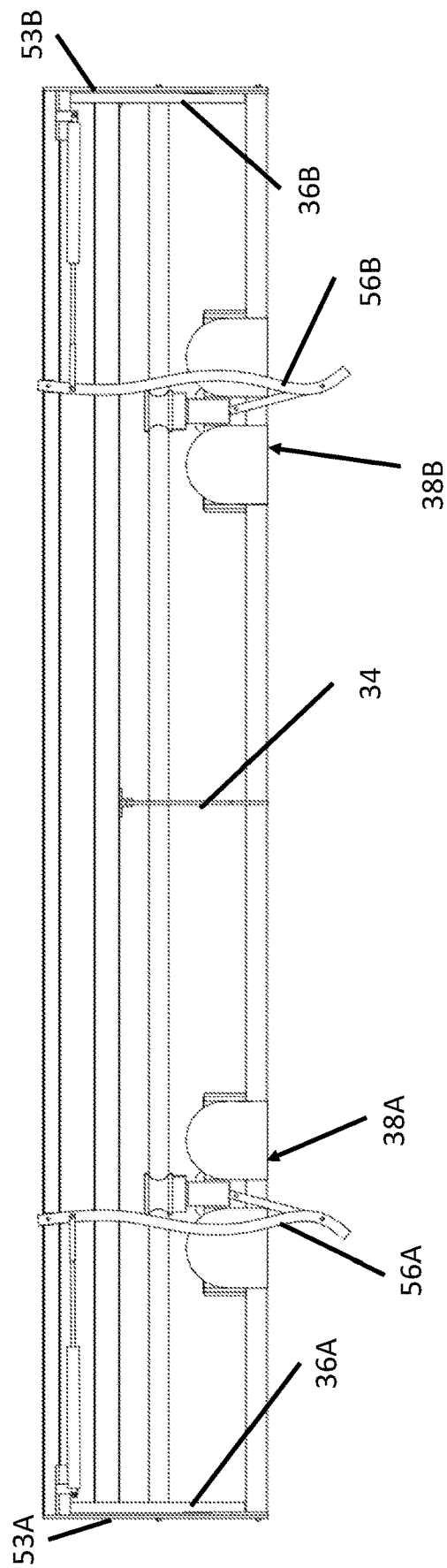
FIG. 6 is a side view of a cross piece according to an exemplary embodiment of the present invention.

As shown in FIGS. 3, 5 and 6, the cross piece 24 is made up of an inner support structure 30 and an outer support structure 50. The inner support structure 30 is made up of a plurality of first cross beams 32 that are attached to one another with a center plate 34 and two back plates 36A, 36B, one at each end of the cross piece inner support structure 30. The first cross beams 32 may include two bottom cross beams and one upper cross beam so as to be arranged in a generally triangular configuration. In an exemplary embodiment, the first cross beams 32 are steel tubing. It should be appreciated that the number and arrangement of cross beams 32 is not limited to what is described and shown, and other exemplary embodiments may involve other arrangement of any number of cross beams.

Figure 4:
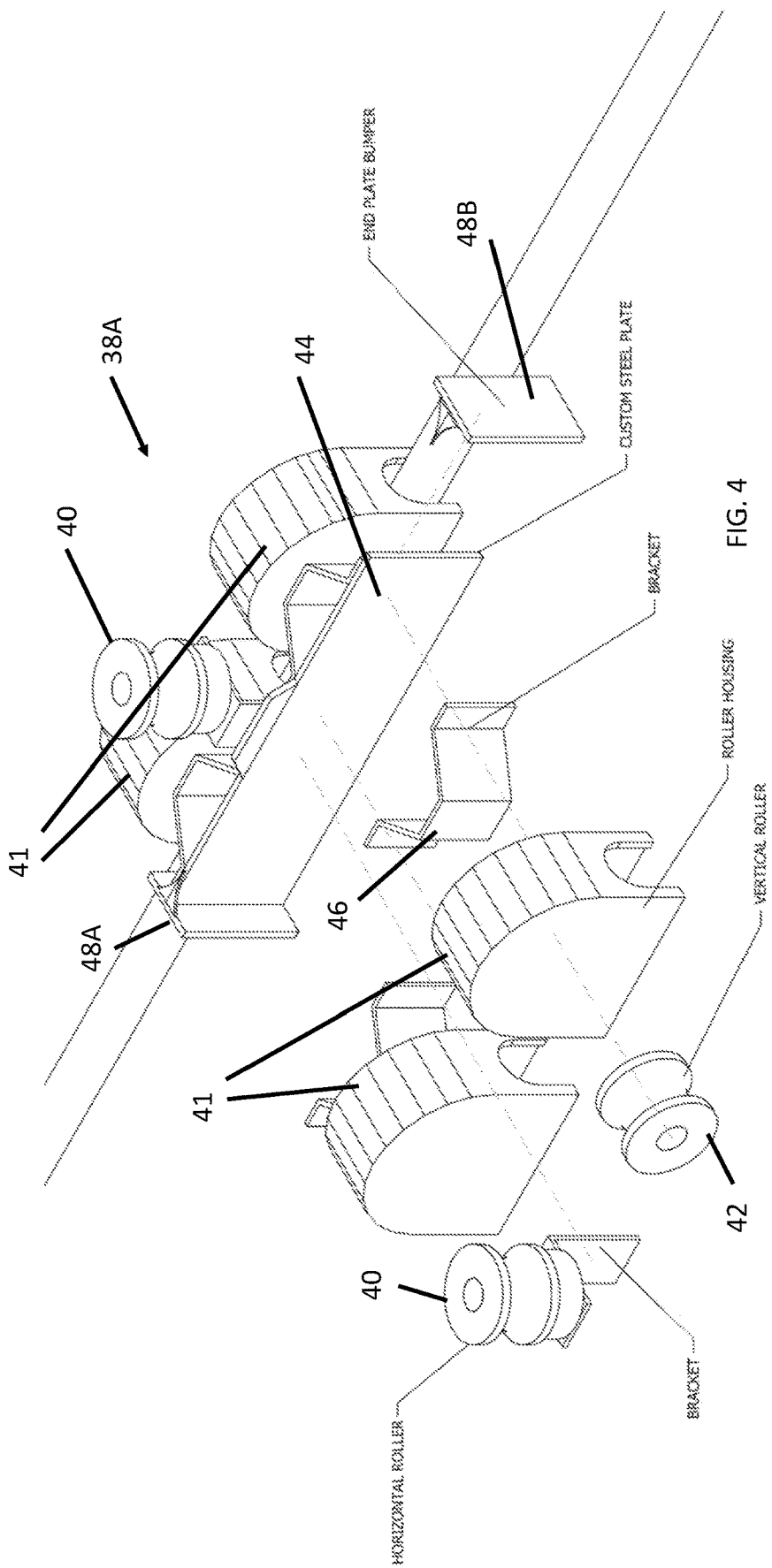
FIG. 4 is a perspective view of a cross piece according to an exemplary embodiment of the present invention.

The first cross beams 32 support two roller assemblies 38A and 38B, with each roller assembly 38A, 38B configured to be moved between a corresponding one of the back plates 36A, 36B and the center plate 34. As shown in FIG. 4, each roller assembly 38A, 38B includes first rollers 40 oriented in a first direction and roller housings 41 that surround second rollers 42 oriented in a second direction that is generally perpendicular to the first direction. In exemplary embodiments, the first rollers 40 have a generally vertical axis of rotation and the second rollers 42 have a generally horizontal axis of rotation. More specifically, in an exemplary embodiment, the first rollers 40 are arranged to roll with their generally vertically oriented roll faces in contact with the upper one of the first cross beams 32 and the second rollers 42 are arranged to roll with their generally horizontally oriented roll faces in contact with a corresponding one of the bottom two cross beams 32. However, it should be appreciated that the placement of the rollers 40, 42 is not limited to this configuration, and in other exemplary embodiments the rollers 40, 42 may be oriented to roll in contact with any one or more of the cross beams 32. In exemplary embodiments, the various components of the roller assemblies 38A, 38B may held together using support elements, such as, for example, any number of plates 44 and brackets 46. In exemplary embodiments, end plate bumpers 48A, 48B may be disposed at each end of the roller assemblies 38A, 38B to prevent damage as the roller assemblies 48A, 48B move between and make contact with the back plates 36A, 36B and the center plate 34.

In an exemplary embodiment, each roller assembly 38A, 38B includes four first rollers 40 and two second rollers 42. However, it should be appreciated that the number of rollers 40, 42 are not limited to these amounts, and in other exemplary embodiments the number of rollers may be varied to be more or less than these amounts.

Each side brush 26A, 26B is rotatably and pivotally connected to a corresponding one of the roller assemblies 38A, 38B to allow the side brushes 26A, 26B to spin around a generally vertical center of rotation. As described in more detail below, the first and second rollers 40, 42 facilitate movement of the side brushes 26A, 26B laterally relative to one another along the cross piece 24 and also pivotally relative to the cross piece 24 and relative to one another.

The outer support structure 50 is fixed to the legs 22A, 22B and is made up of second cross beams 52 attached at their ends by face plates 53A, 53B. The outer support structure 50 holds linear actuators, such as, for example, pneumatic piston assemblies 54A, 54B, one at each end of the outer support structure 50. Lever arms 56A, 56B connect the piston assemblies 54A, 54B to the corresponding roller assemblies 38A, 38B. In exemplary embodiments, the piston assemblies 54A, 54B are actuated to move the roller assemblies 38A, 38B towards and away from one another to create corresponding movement of the side brushes 26A, 26B. It should be appreciated that the linear actuators used to move the roller assemblies 38A, 38B are not limited to pneumatic piston assemblies, and in other exemplary embodiments various other types of actuators may be used, such as, for example, hydraulic actuators, chain drives, pulleys, electric actuators, and electrohydraulic actuators, to name a few.

In an exemplary embodiment, the side brushes 26A, 26B are moved in a sequence that involves a first movement towards one another, a second movement away from one another, and a third movement towards one another. This sequence of movements causes the side brushes 26A, 26B to first clean the front of the vehicle 100 as the vehicle 100 enters the wrap around station 8, then clean the sides of the vehicle 100 as the vehicle 100 proceeds through the wrap around station 8, and then clean the back of the vehicle 100 as the vehicle 100 exits the wrap around station 8. Further, as the side brushes 26A, 26B are moved back and forth relative to one another in sequence, the side brushes 26A, 26B are free to pivot relative to the cross piece 24 and relative to one another by virtue of their pivotal attachment to the roller assemblies 38A, 38B. The first rollers 40 facilitate smooth lateral movements of the side brushes 26A, 26B, while the second rollers 42 facilitate the pivoting motion of the side brushes 26A, 26B by their horizontal rotation on the bottom two cross beams 32. The pivoting motion of the side brushes 26A, 26B allows the side brushes 26A, 26B to be pushed aside by the vehicle 100 as it moves through the wrap around station 8 while maximizing contact of the side brushes 26A, 26B with the vehicle surface so that the vehicle 100 can be more effectively cleaned.

In an exemplary embodiment, the inner support structure 30 is pivotally attached to the outer support structure 50 (and the main support structure 20). This allows for even more freedom of movement of the side brushes 26A, 26B. Stops (not shown) may be placed at appropriate positions on the outer support structure 30 and/or main support structure 20 to limit the rotation of the inner support structure 30.

While in the foregoing specification a detailed description of a specific embodiment of the invention was set forth, it will be understood that many of the details herein given may be varied considerably by those skilled in the art without departing from the spirit and scope of the invention.

The invention claimed is:

1. A wrap around station of a car wash, comprising:
    a cross piece comprising a plurality of cross beams;
    a pair of roller assemblies disposed on the cross piece, each roller assembly comprising:
        one or more first rollers with a substantially vertical axis of rotation, the one or more first rollers being arranged to rotate in contact with a first one of the plurality of cross beams; and
        at least one pair of second rollers, each second roller in the at least one pair of second rollers having a substantially horizontal axis of rotation, one second roller in the at least one pair of second rollers being arranged to rotate in direct contact with a second one of the plurality of cross beams and another second roller in the at least one pair of second rollers being arranged to rotate in direct contact with a third one of the plurality of cross beams;
    a pair of linear actuators, each linear actuator configured to move a corresponding one of the roller assemblies along the cross piece; and
    a first side brush and a second side brush, each pivotally and rotatably attached to a corresponding one of the roller assemblies so that the first and second side brushes are moveable along the cross piece and pivotable relative to the cross piece and towards and away from one another
    wherein the first cross piece, second cross piece, and the third cross piece are all connected by a back plate such that the first cross piece, second cross piece, and the third cross piece are each spaced from each other.

2. The wrap around station of claim 1, wherein the one or more first rollers comprise at least one pair of first rollers.

3. The wrap around station of claim 2, wherein each first roller in the pair of first rollers is arranged to rotate in direct contact with the first one of the plurality of cross beams.

4. The wrap around station of claim 1, wherein the linear actuators comprise pneumatic piston assemblies.

5. The wrap around station of claim 1, wherein the cross piece comprises an inner support structure and an outer support structure.

6. The wrap around station of claim 5, wherein the pair of linear actuators are disposed on the outer support structure.

7. The wrap around station of claim 6, wherein the pair of roller assemblies are disposed on the inner support structure.

8. The wrap around station of claim 5, wherein the inner support structure is rotatably mounted to the outer support structure.

9. The wrap around station of claim 1, further comprising lever arms that attach each linear actuator in the pair of linear actuators to a corresponding one of the roller assemblies in the pair of roller assemblies.

10. The wrap around station of claim 1, wherein the cross piece further comprises a center plate disposed between the roller assemblies.

11. The wrap around station of claim 1, wherein the linear actuators are configured to move the first and second side brushes in a sequence of movements.

12. The wrap around station of claim 11, wherein the sequence of movements comprises a first movement in which the first and side brushes are moved towards one another, a second movement in which the first and second brushes are moved away from one another, and a third movement in which the first and second brushes are again moved towards one another.

* * * * *